United States Patent [19]

Clemens et al.

[11] Patent Number: 5,671,607
[45] Date of Patent: Sep. 30, 1997

[54] COMPRESSION REFRIGERATION MACHINE

[75] Inventors: Herbert Clemens; Ulrich Plantikow; Detlef Wüsthoff, all of Munich, Germany

[73] Assignee: SEP Gesellschaft Für Technische Studien Entwicklung Planung mbH, Ismaning, Germany

[21] Appl. No.: 551,856

[22] Filed: Nov. 7, 1995

[30] Foreign Application Priority Data

Nov. 7, 1994 [DE] Germany .......................... 44 39 780.1

[51] Int. Cl.$^6$ .................................. F25B 1/00; F25B 39/04
[52] U.S. Cl. .................................. 62/228.4; 62/114; 62/508
[58] Field of Search .................... 62/508, 114, 498, 62/228.4

[56] References Cited

U.S. PATENT DOCUMENTS 2,031,080  2/1936  Van Deventer ................... 62/508
4,307,576  12/1981  Takano et al. ................... 62/204

FOREIGN PATENT DOCUMENTS

| 0 203 477 A1 | 12/1986 | European Pat. Off. . |
| 543 987 | 2/1932 | Germany . |
| 723 128 | 7/1942 | Germany . |
| 3823559 C1 | 6/1989 | Germany . |
| PCT/US91/ 03095 | 11/1991 | WIPO . |
| 94/25807 | 11/1994 | WIPO ..................... 62/508 |

*Primary Examiner*—William E. Wayner
*Attorney, Agent, or Firm*—Graham & James LLP

[57] ABSTRACT

A compression refrigeration machine is provided having ammonia as a refrigerant and including a condenser, a throttle device, an evaporator device, and a motor-compressor unit. The motor compressor unit includes an electric motor that drives a compressor and may be arranged in a semi-hermetic or hermetic encapsulation. In an hermetic encapsulation, the electric motor is located outside a suction gas stream flowing into the compressor and outside a discharge gas stream exiting from the compressor so that the electric motor is only exposed to an essentially static ammonia atmosphere. The motor-compressor unit and the semi-hermetic encapsulation are composed of materials stable or resistant to ammonia.

27 Claims, 11 Drawing Sheets

Cooling temperature T = -5°C (above-freezing refrigeration)

| Design | $Q_0$ (kW) | $T_{Air}$ (°C) | $\epsilon_K$ | $\eta_{el}$ | $P_{KT}$ (kW) | $\Sigma P_{el}$ (kW) | Weighting factor | Wa [kWh/a] |
|---|---|---|---|---|---|---|---|---|
| Direct evaporation + On-off control | 5 | 20 (indoor) | 1.9 | 0.9 | -- | 2.9 | 0.5 | 48360 |
| | 10 | 7.5 (annual mean for Munich) | 1.95 | | | 5.7 | 0.25 | |
| | 20 | | 2.1 | | | 10.6 | 0.25 | |
| Secondary refrigerant circulation + Rotary speed control | 5 | | 3.7 | 0.8 | 1 | 2.69 | 0.5 | 38281 |
| | 10 | | 3.7 | 0.8 | | 4.4 | 0.25 | |
| | 20 | | 3.5 | 0.85 | | 7.7 | 0.25 | |

COMPRESSION REFRIGERATION MACHINE

The invention relates to a compression refrigeration machine having ammonia as refrigerant.

Such ammonia-compressor refrigeration systems are disclosed, for example, by the textbook "Ammoniak-Verdichter-Anlagen [Ammonia-compressor systems]", Volume 1: Ausrüstungen, Berechnung und Projektierung [equipment calculation and design], Hans Dölz/Peter Otto (Editors), Verlag C. F. Müller, Karlsruhe, and by the Handbuch der Kältetechnik [Refrigeration engineering handbook] by Plank. Refrigeration machines having the refrigerant ammonia, piston compressors and separate brine circulations are also disclosed by the Refrigeration engineering handbook by Plank.

These known ammonia refrigeration machines or systems are designed as what are termed open systems, i.e. the compressor in which the refrigerant ammonia flows is sealed off from the surrounding by means of a shaft seal (driveshaft between motor and compressor). Since relatively small amounts of ammonia always escape via such shaft seals and even very small amounts of ammonia lead to odor pollution, these known ammonia refrigeration machines have been used to date only in the open or in areas in which the odor pollution can be tolerated.

DE-C 859 897 discloses a refrigeration machine which has a hermetically encapsulated motor-compressor unit. The article "Refrigeration units having semi-hermetic compressors and two rotary speeds" in the journal "Klima-Kälte-Heizung", 1/1980, pages 7–9, discloses a refrigeration machine having a semi-hermetic motor-compressor unit.

DE-C 26 43 622 discloses a refrigeration machine having a screw compressor with an economizer circuit. In this case the screw compressor has two suction ports which draw in and compress refrigerant vapor at different pressure and temperature levels.

Comparable refrigeration systems are also disclosed by DE-A 24 47 116 and DE-A 36 06 067.

The object of the present invention is to develop refrigeration machines having ammonia as refrigerant in such a manner that no odor pollution due to ammonia occurs.

This object is achieved by the features of claim 1.

Owing to the semi-hermetic encapsulation of the motor-compressor unit, odor pollution due to ammonia escaping from the motor-compressor unit is excluded. Arranging the electric motor within the semi-hermetic encapsulation outside the ammonia stream means that the electric motor is only subjected to an essentially static ammonia atmosphere. The refrigerant vapor or ammonia vapor is therefore not conducted through the motor, even if the motor is accessible to the refrigerant. The motor cavity merely forms a type of pressure equalization vessel for the refrigerant gas. This measure means that the expenditure or increased costs of an ammonia-resistant electric motor become economically justifiable and at the same time the service life of the ammonia-resistant electric motor also remains economically justifiable.

By building motor and compressor into a shared housing, a fully-hermetic refrigeration system can also be implemented.

However, owing to the semi-hermetic encapsulation, repairs, which can become necessary on the ammonia-resistant electric motor due to corrosion even in a static ammonia atmosphere, can be carried out more cost-effectively.

Employing ammonia as refrigerant is advantageous, because this is, in this case, a very inexpensive refrigerant having outstanding thermodynamic properties. Furthermore, ammonia does not show the harmful effects on the atmosphere (greenhouse effect, ozone destruction) of the refrigerants CFCo, fluorinated hydrocarbons etc., used to date. Permanently elastic, ammonia- and oil-resistant materials are required for the O-ring seals. Only the extremely expensive perfluoroelastomers currently fulfil these requirement. Such O-rings are available, e.g., under the brand names Kalrez (DuPont) or Simriz (Freudenberg). Of the inexpensive sealing materials, only chlorobutadiene rubber (CR) is suitable with restriction, if refrigerant oils having a low elastomer compatibility index as specified by ISO 6072 can be used. Although this material is resistant to ammonia, it swells in contact with mineral oils and contains double bonds which can be attacked chemically.

Owing to the arrangement of compressor and drive unit in a semi-hermetic encapsulation, ammonia can be used as refrigerant even without particular safety precautions, since no ammonia can escape to the outside. The toxicity and inflammatory properties of ammonia are therefore of no significance.

By arranging the electric motor outside the ammonia stream, i.e. avoiding the otherwise customary suction gas or discharge gas cooling of the compressor and the electric motor, an adverse effect on the efficiency owing to the decrease in the vapor density is avoided.

Oil, used for lubricating and cooling the compressor, which is entrained by the refrigerant steam from the compressor is, in combination with ammonia, particularly aggressive to plastics to the prevailing operating temperatures (up to 80° C.). Arranging the electric motor outside the refrigerant stream prevents or hinders this oil and other solid or liquid contaminants entrained in the refrigerant stream from passing into the electric motor and there causing damage.

The advantageous development of the invention as claimed in claim 2 shows a particularly cost-effective implementation of the ammonia-resistant electric motor.

The advantageous development of the invention as claimed in claim 3 enables avoidance of the casting resins customarily used for fixing the stator coils, but which are not simultaneously resistant to ammonia and oil.

The advantageous development of the invention as claimed in claim 4 teaches the use of a nonelastic flat seal, in particular made of graphite, for the semi-hermetic encapsulation. This seal features a long service life. Teflon, despite its resistance, is less suitable as sealing material, since it can deform plastically.

Cooling by means of oil injection (claim 5) can achieve high pressures and thus correspondingly high condensation temperatures in a single-stage compression. This is important in particular in the case of ammonia as refrigerant, since ammonia would greatly overheat without cooling in a single-stage compression.

By means of the semi-hermetic encapsulation in combination with cooling by oil injection (claim 5), it is possible, using only one compression stage, to produce deep-freeze refrigeration at evaporator temperatures of $T_O = 40°$ C. and below, since the oil injected into the compressor absorbs and removes the resulting heat of compression even at high condensation pressures.

Owing to the advantageous vertical arrangement of the motor-compressor unit with the motor above the compressor (claim 7), gravity additionally prevents or considerably hinders oil entrained in the refrigerant stream from passing into the motor.

Owing to the semi-hermetic encapsulation, it is also possible to design the refrigeration machine for suction pressures below ambient pressure (claim 8), without running the risk of the refrigerant circulation becoming "poisoned" by the penetration of air and atmospheric moisture.

Compressors which are particularly suitable are all compressors having rotating compression elements in which the pressure increases continuously from the suction side (compressor inlet) to the pressure side (compressor outlet). Particularly suitable are screw compressors according to claim 9. Piston compressors, in which the pressure alternately increases and decreases again, are less suitable, since such compressors cannot be furnished with two or more suction ports for the simultaneous suction of gas at different pressure levels. Because of their spring-loaded suction valves and outlet valves, piston compressors are, moreover, unsuitable for operation in a high rotary speed region.

By the use of a brine or secondary refrigerant circulation (additional ΔT) separated from the refrigeration circuit (claim 10) which is energetically unfavorable per se, it is possible to place the condenser in the external area and to adapt the condenser temperature to the prevailing external temperature. When one considers that the annual means temperature in Munich is 7.4° C., it is clear that a considerable potential for savings is present here. Matching, according to the invention, the condensation temperature to the external temperature which is lower in comparison with the indoor temperature gives a lower pressure drop at the compressor, which causes a correspondingly lower electrical power consumption or a corresponding energy saving.

A further advantage of the additional brine circulation is that the brine or secondary refrigerant circulation pipe network does not have to be laid by an appropriately trained refrigeration engineer, but that this task can be accomplished by a plumber.

The speed of an electric motor is preferably controlled by means of a frequency converter.

Control of the rotary speed of the compressor has the effect that the compressor—other than is the case with the conventional on-off control—does not always operate at the optimum efficiency. Furthermore, control of the rotary speed is complex and expensive. However, it has been shown that the overall efficiency of the refrigeration machine increases, since, because of the rotary speed control, in each case only sufficient refrigerant is compressed and transported so that the refrigeration capacity then required can be produced. By this means, the refrigeration machine is continuously matched to the current requirement or controlled in accordance with demand.

The refrigeration capacity is matched to the demand particularly advantageously according to claims 12 and 13 by the rotary speed being controlled by the brine temperature, in particular by the brine return line temperature. Alternatively, the rotary speed can also be controlled via the evaporator temperature.

According to a particularly preferred embodiment of the invention, two evaporators are provided in the secondary refrigerant circulation which produce refrigeration capacity at different temperature levels. The gaseous refrigerant produced at different pressure and temperature levels in these two evaporators is fed to the screw compressor via two separate suction ports, as are known per se from screw compressors having an economizer circuit.

The remaining subclaims relate to further particularly economical circuits.

Further details, features and advantages of the invention are given by the description below with reference to the drawings. In the figures.

Figure 1:
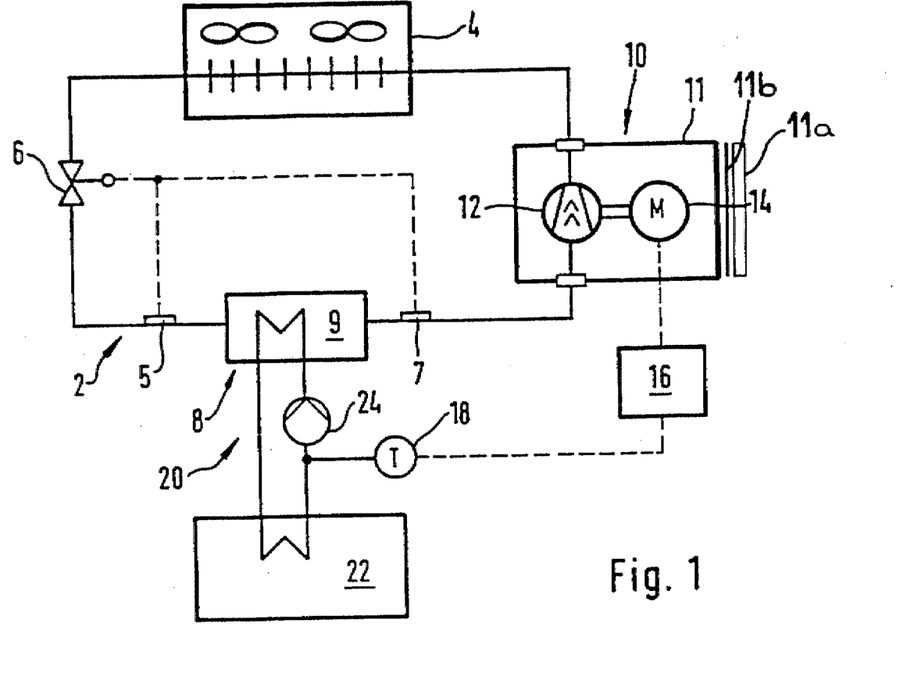
FIG. 1 shows a diagrammatic representation of a first embodiment of the invention.

FIG. 1 shows a first embodiment of the invention in which a refrigerant circulation 2 is maintained through a condenser 4, a throttle device 6, an evaporator 8 and a motor-compressor unit 10. The motor-compressor unit 10 comprises a screw compressor 12 which is driven by an electric motor 14. The motor-compressor unit 10 is constructed in a semi-hermetic encapsulation 11. The semi-hermetic encapsulation 11 comprises a vessel which is adapted to be semi-hermetically sealed by a screwable cover 11a and an inelastic flat seal 11b, such as comprised of graphite. The rotary speed of the screw compressor 12 and thus the suction power is controlled via a speed controller 16. The refrigeration capacity generated in the evaporator 8 is transferred to a brine or secondary refrigerant circulation 20 which releases the refrigeration capacity to the material to be cooled via a heat exchange device 22. The brine in the brine circulation 20 is circulated by a liquid pump 24.

The throttle device 6 in the first embodiment is an electronic expansion valve as is disclosed by, e.g., DE-C 41

00 749. The electronic expansion valve 6 includes temperature sensors 5 and 7 which determine the temperature of the refrigerant upstream and downstream of the evaporator 9. The electronically controlled expansion valve 6 is able to set the volumetric flow rate, as a function of the refrigeration capacity and evaporation temperature demanded, in such a way that a desired superheating temperature of the ammonia vapor is ensured even in the event of a highly fluctuating required refrigeration capacity.

The motor-compressor unit 10, as a semi-hermetic unit, is able to compress the suction gas to pressures of 2.5 MPa under an ammonia atmosphere (ammonia as refrigerant). The electric motor 14 is constructed as a pressure-resistant, ammonia-resistant asynchronous motor. For example, the electric motor 14 may include wedge-shaped stator coils that are comprised of aluminum and are insulated in an ammonia-resistant manner, such as by use of PTFE. The control device 16 receives the output variable from a temperature sensor 18 which determines the brine return line temperature. By means of the rotary speed controller 16, only as much suction gas or refrigerant is drawn in and compressed in each case as refrigeration capacity is demaned via the heat exchange device 22.

The evaporator device 8 in the first embodiment preferably comprises a completely welded plate heat exchanger 9 which is partially or completely (flooded evaporator) filled with boiling ammonia as refrigerant. The refrigeration capacity is transported from the evaporator 9 to the heat exchange device 22 by a non-toxic, biodegradable secondary refrigerant which is preferably permitted for the food sector.

Figure 2:
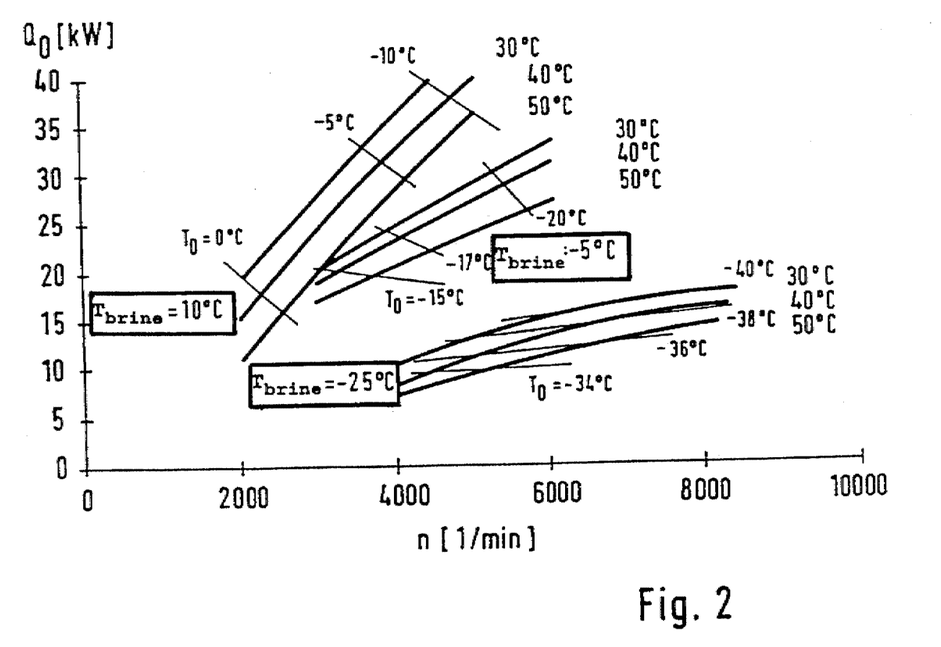
FIG. 2 shows measured refrigeration capacity performance characteristics of the novel refrigeration machine for deep-freeze refrigeration, above-freezing refrigeration and air-conditioning refrigeration.

For the embodiment according to FIG. 1, refrigeration capacity performance characteristics were determined with information on evaporation and condenser temperatures for the regions of deep-freeze refrigeration, above-freezing refrigeration and air-conditioning refrigeration (brine temperatures of T=−25° C., −5° C., 10° C.), as are shown in FIG. 2. These refrigeration capacity performance characteristics offer refrigeration engineers the possibility of designing their own system in relation to the particular application. In the diagram of FIG. 2, the rotary speed of the compressor is plotted on the X axis and the refrigeration capacity available at the heat exchange device 22 is plotted on the Y axis. For brine temperatures $T_{brine}$ of −25° C., −5° C. and 10° C., three respective characteristic lines are represented in FIG. 2, each of which relate to three different condenser temperatures of $T_c$ of 30° C., 40° C. and 50° C. Three curves in each case are likewise drawn in for the evaporator temperatures $T_O$ assigned to the respective brine temperatures.

Table 1 below, for deep-freeze refrigeration, above-freezing refrigeration and air-conditioning refrigeration, gives the maximum values achieved in each case for refrigeration capacity $Q_O$, performance coefficient $\epsilon_K$, efficiency $\eta_{KC}$ and evaporator temperature $T_O$ with the system implemented according to the invention.

TABLE 1

| | $Q_O$ (kW) | $\epsilon_K$ | $\eta_{EC}$ | $T_O$ (°C.) | $T_{brine\ return\ line}$ (°C.) |
|---|---|---|---|---|---|
| Deep-freeze refrigeration | 17 | 1.5 | 0.42 | −40 | −25 |
| Above-freezing refrigeration | 33 | 2.5 | 0.52 | −22 | − 5 |
| Air-conditioning refrigeration | 42 | 3.3 | 0.55 | −19 | −10 |

(Condensation temperature) $T_c$ = 30° C.)

Figure 3:
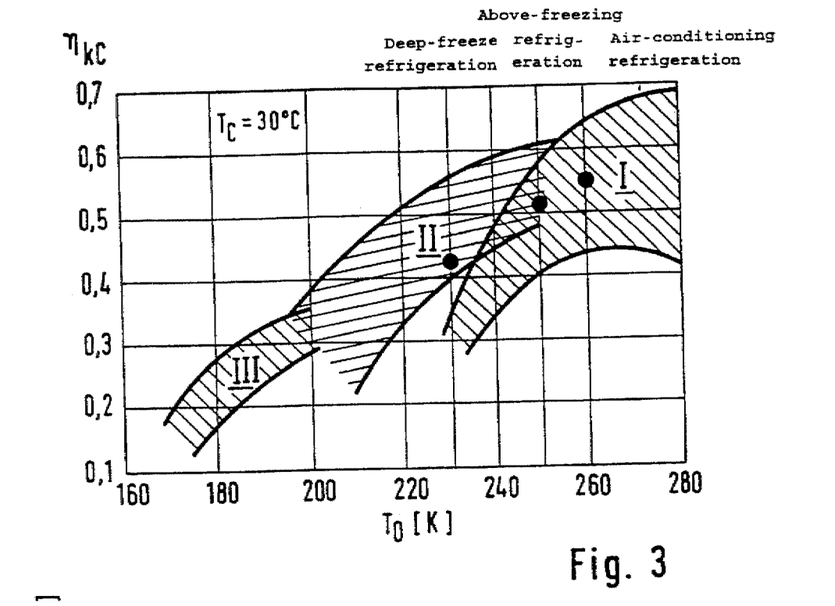
FIG. 3 shows measured efficiencies of the novel refrigeration machine in comparison with known or conventional single-, two- and three-stage refrigeration machines, for the refrigerant ammonia.

The values from Table 1 are drawn in FIG. 3 in a diagram in which the evaporator temperature $T_O$ in kelvin is plotted on the X axis and the efficiency $\eta_{KC}$ is plotted on the Y axis.

The hatched regions show the values achievable using conventional refrigeration systems, and the points show the values achieved using the novel refrigeration system according to FIG. 1. In comparison to the range of scattering of the efficiencies of conventional ammonia systems, an excellent starting position is shown, especially in the direction of low temperatures, which, taking into account possibilities for optimization which are as yet unutilized, promises a very good economic efficiency. However, the overall economics do not depend alone on the process quality.

Figure 4:
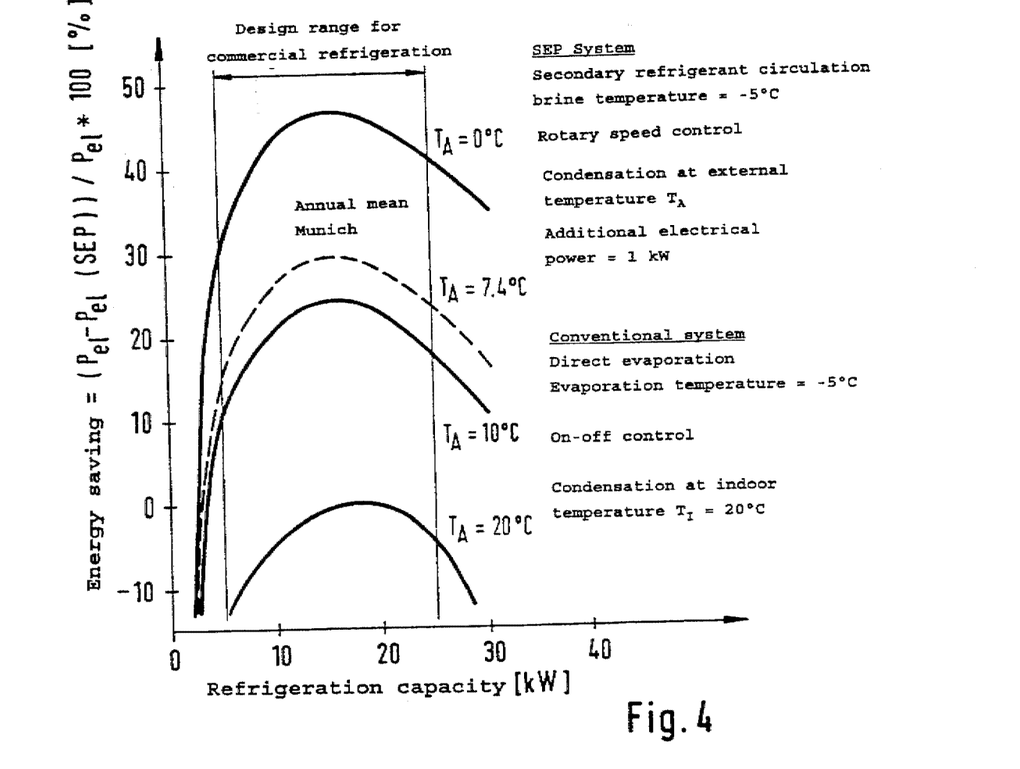
FIG. 4 shows a graphic representation of the reduction in drive energy for the novel refrigeration machine in comparison with conventional refrigeration machines.

FIG. 4 shows a diagram which shows the energy savings with the use of the novel refrigeration system according to FIG. 1 in comparison to conventional refrigeration systems. In this case, the refrigeration capacity in kilowatts is plotted on the X axis and the percentage energy saving=($P_{el}$(prior art)−$P_{el}$(invention))/$P_{el}$(prior art)+100 is plotted on the Y axis. As a comparison in this case, a conventional system was assumed and simulated in the test which, with direct evaporation, i.e. without brine circulation, is designed for an evaporation temperature of −5° C., has on-off control and has a condensation temperature of approximately 20° C. (indoor temperature). The various curves relate here to different external temperatures $T_A$ on which the condenser temperature $T_C$ of the novel refrigeration machine depends.

If the advantage of a separate secondary refrigerant circulation is exploited and it the condenser 4 is cooled with external air, on cold days and nights, considerable advantages result which can lead to a reduction in the drive power $P_{el}$ of up to 35%. If the novel rotary speed control is used at the same time, at an external temperature around freezing point, savings of drive energy of up to 50% are possible.

The rotary speed control follows the load requirements even in the event of a highly erratic course without significant overshoots. Even highly varying ambient conditions do not lead to critical system reactions.

For a commercial refrigeration plant for above-freezing refrigeration (−5° C.) operating by the principle according to the invention, the annual electricity consumption may be estimated making the following simplifying assumption:

system operation at a mean annual air temperature for Munich $T_A$=7.4° C.

constant electricity consumption by the pump 24 n the secondary refrigerant circulation, actuator, electronic controller: $P_{KT}$ approximately 1 kW apportionment of the refrigeration capacity requirements for above-freezing refrigeration into

| 50% low load | ($Q_O$ = 5 kW) |
| 25% medium load | ($Q_O$ = 10 kW) |
| 25% full load | ($Q_O$ = 20 kW) |

Figure 5:
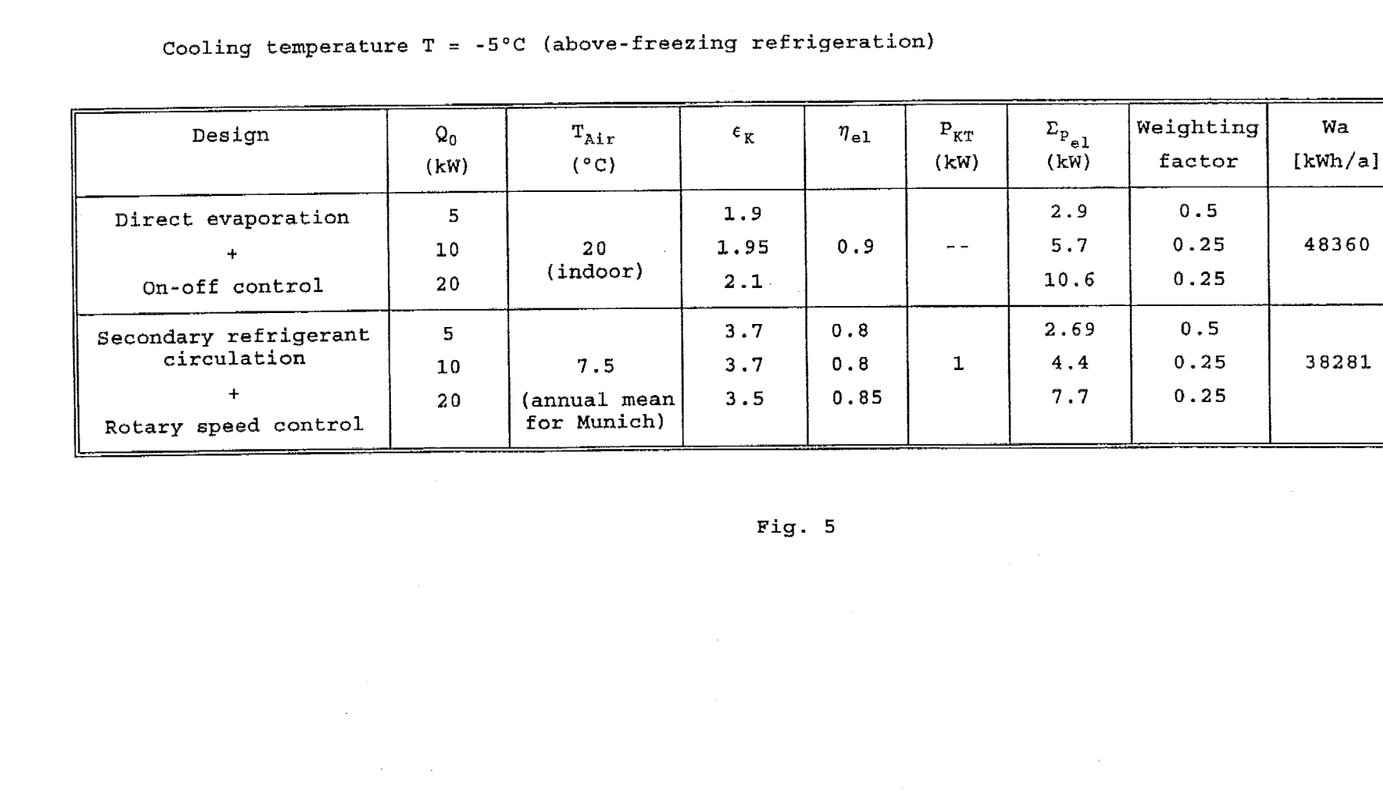
FIG. 5 shows a table from which the potential savings of the novel system in comparison with a conventional system can be seen.

As may be taken from the table in FIG. 5, when the novel refrigeration machine is used, a saving of approximately 10,000 kWh/year results in comparison to a conventional refrigeration system. At an electricity price of 0.20 DM/KWh, this corresponds to a saving of approximately 2,000 DM per year.

For air conditioning with air temperatures significantly above the indoor temperature, by the use of the rotary speed control, a saving of electrical energy still of 15% can be expected. At a means annual air conditioning power of 10 kW and a performance coefficient of 3.3 (see Table 1), this corresponds to a saving of approximately 4000 kWh/year. A secondary refrigerant circulation in this case, together with an air-cooled condenser, does not introduce any advantages going beyond this, since its energetically beneficial effect is based on the exploitation of low external temperatures.

In the description below of further embodiments of the invention, identical reference numbers are used for the same or corresponding components.

Figure 6:
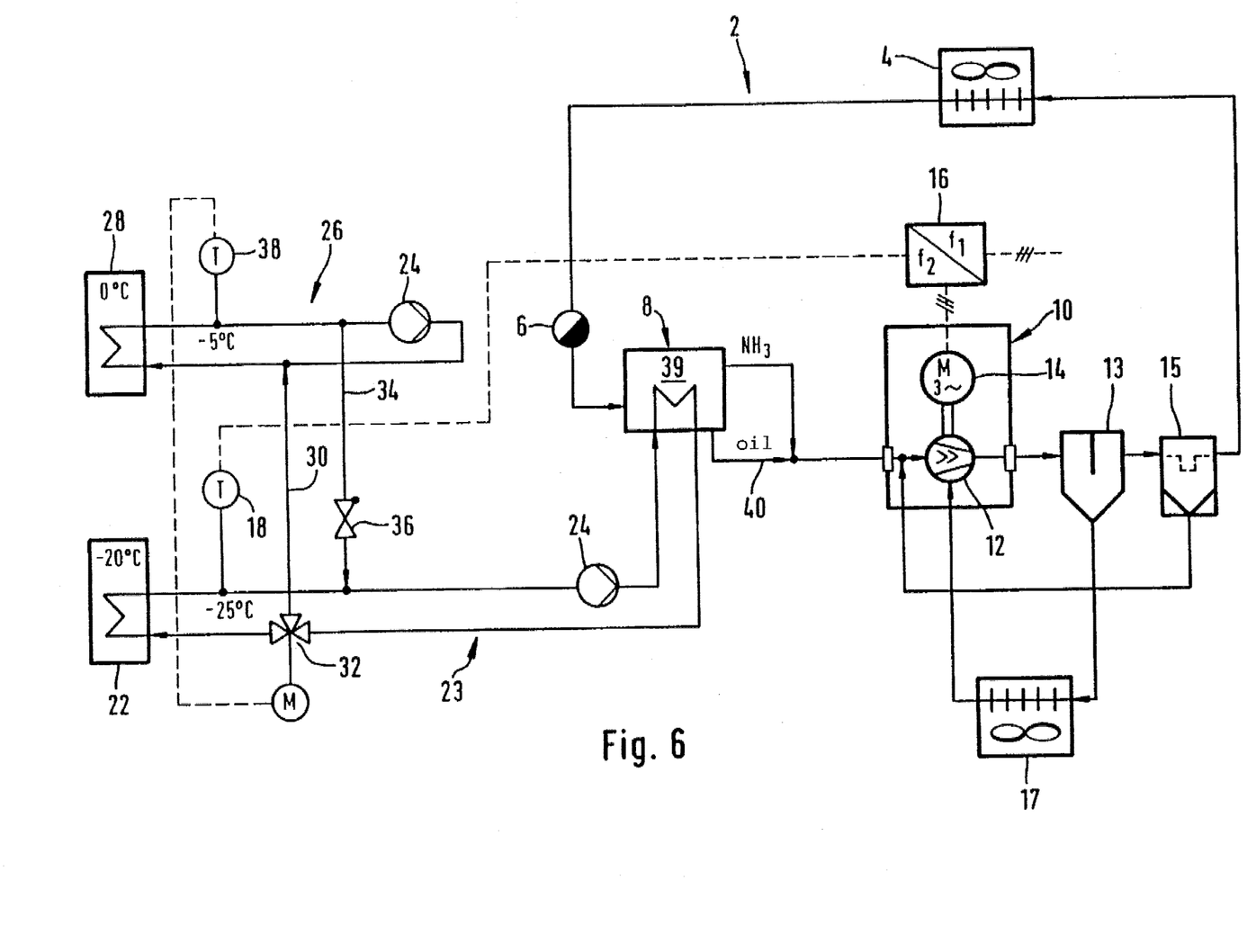
FIG. 6 shows a second embodiment of the invention in which two mutually connected brine circulations are provided for making available refrigeration capacity at different temperature levels.

FIG. 6 shows a second embodiment of the present invention which essentially differs from the embodiment according to FIG. 1 by two secondary refrigerant circulations 23 and 26 being provided. The secondary refrigerant circulation 26 is circulated, as is the secondary refrigerant circulation 23, by a liquid pump 24 and passes through a second heat exchange device 28. The first heat exchange device 22 provides, for example, refrigeration capacity at a temperature level of –20 C. (deep-freeze) refrigeration), whereas the second heat exchange device 28 provides refrigeration capacity at a temperature level of, for example, 0° C. (standard refrigeration).

Via a line 30 and a motor-driven three-way mixer 32, the flow line of the secondary refrigerant circulation 26 is connected to the flow line of the secondary refrigerant circulation 23. Via a line 34 and a nonreturn valve 36, the return line of the secondary refrigerant circulation 26 is connected to the return line of the secondary refrigerant circulation 23.

The total refrigeration capacity is controlled, as in the embodiment according to FIG. 1, via a rotary speed control device 16, the brine temperature sensor 18 being arranged in the return line of the first secondary refrigerant circulation 23, i.e. in the secondary refrigerant circulation having the lower temperature. The setting of the three-way mixer 32 is made via a temperature sensor 38 which is arranged in the return line of the second secondary refrigerant circulation 26. By this means, a small addition of very cold brine or secondary refrigerant from the first secondary refrigerant circulation 22 into the relatively warmer second secondary refrigerant circulation 26 controls the refrigeration capacity produced in the second heat exchange device 28. The refrigeration capacity produced in the first heat exchange device 22 and the total refrigeration capacity is controlled as in the embodiment according to FIG. 1.

The motor-compressor unit 10 corresponds in its construction to that of FIG. 1, it is merely arranged vertically having the motor 14 above the compressor 12. In addition, in FIG. 6, a first oil separator 13 and a second oil separator 15 downstream of the first oil separator 13 are furtehr shown in FIG. 6 between motor-compressor unit 10 and condenser 4. The oil taken off from the first oil separator 13 is cooled by an oil cooler 17. The oil separated off in the second oil separator 15 is fed directly via a drain line to the compressor 12. The oil separated off in the first oil separator 13 is first cooled in the oil cooler 17 and then supplied to the screw compressor 12 for lubrication, sealing and cooling. These additional components can also be provided in the embodiment according to FIG. 1.

The evaporator device 8 comprises a flooded evaporator 39 having an oil drain 40. The oil taken off from the evaporator 39 by the oil drain 40 is fed directly back to the suction gas stream. In the second embodiment, instead of the electronic expansion valve, the throttle device 6 used is a high-pressure float separator which is both inexpensive and matches well with the "flooded evaporator" system 39.

As in the embodiment according to FIG. 1, the rotary speed control 16 receives the cooling brine return line temperature in the first secondary refrigerant circulation 23 as a controlled variable so that a maximum temperature of, e.g., –20° C. is guaranteed in the cooling chamber. If necessary, the second brine or secondary refrigerant circulation 26 having the higher temperature level can be fed with the very low temperature brine. The temperature of the second secondary refrigerant circulation 26 is, as mentioned, ensured by the motor-driven three-way mixer 32. The maximum refrigeration capacity of the system having two brine circulations 23 and 26 corresponds in total to the refrigeration capacity for the simple deep-freeze refrigeration, i.e.

Refrigeration capacity $Q_0$ max=17 kW
(condensation temperature Tc=30° C.)

Evaporation temperature $T_0$=–40° C.
$T_{brine1}$=–25° C.
$T_{brine2}$=–5° C.

Figure 7:
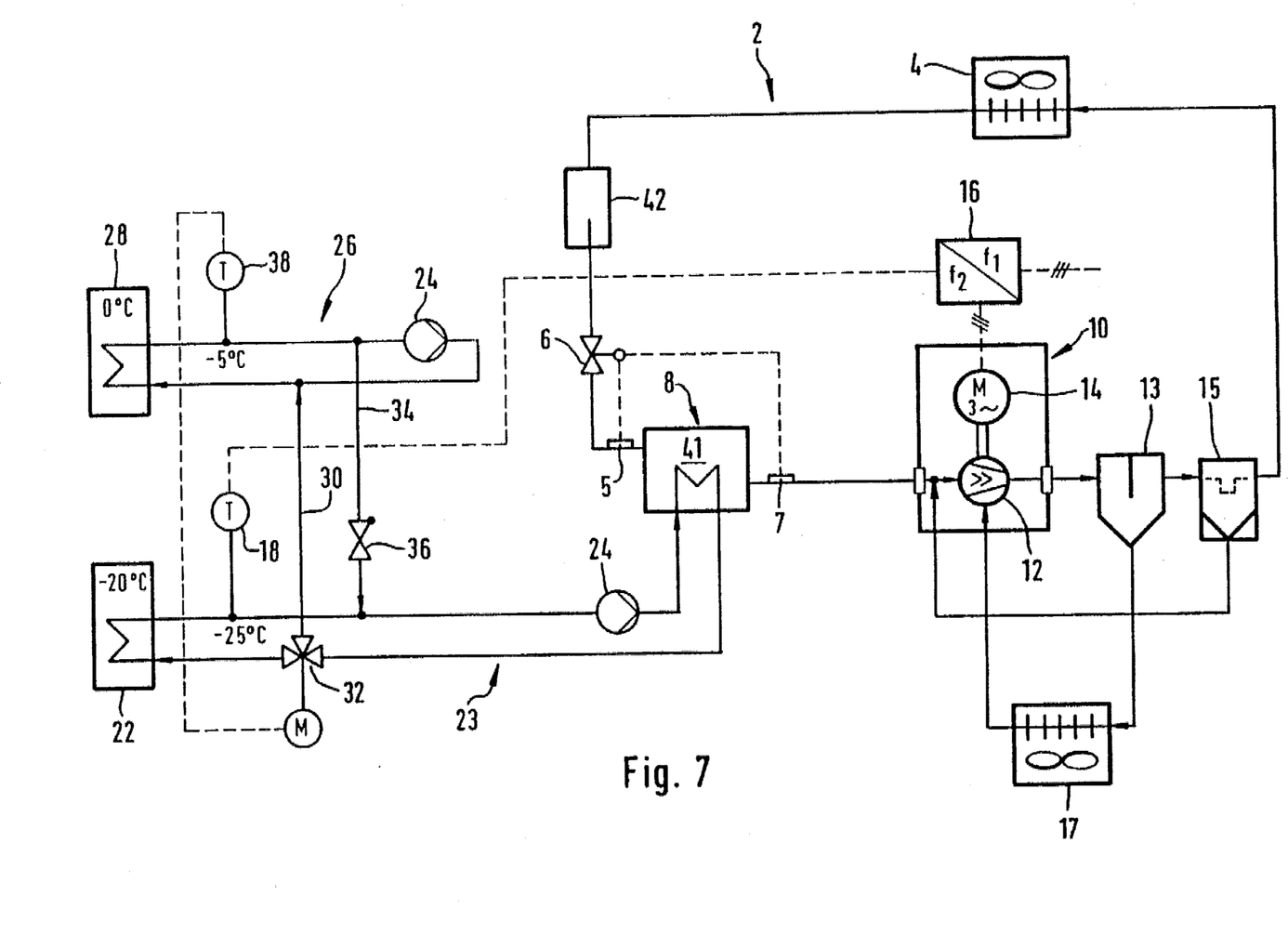
FIG. 7 shows a third embodiment which differs from the second embodiment only by a modified throttle device.

FIG. 7 shows a third embodiment of the present invention which essentially corresponds to the embodiment according to FIG. 6. The difference is merely that the evaporator device 8 is a dry evaporator 41 instead of a flooded evaporator and the throttle device 6 used is again an electronic expansion valve instead of the high-pressure float separator. In addition, a liquid collector 42 is connected between condenser 4 and the throttle device 6. The dry evaporator 41 with injection from the top requires a superheating controller which is produced by the electronic expansion valve 6.

The advantage of this third embodiment is the low refrigerant requirement. When the 10 kg limit is undershot, this has advantages in erecting the system in accordance with the legal regulations (VBG 20). However, the superheating control with control valve and expansion valve is somewhat more expensive than the simple high-pressure separation in accordance with FIG. 6.

Figure 8:
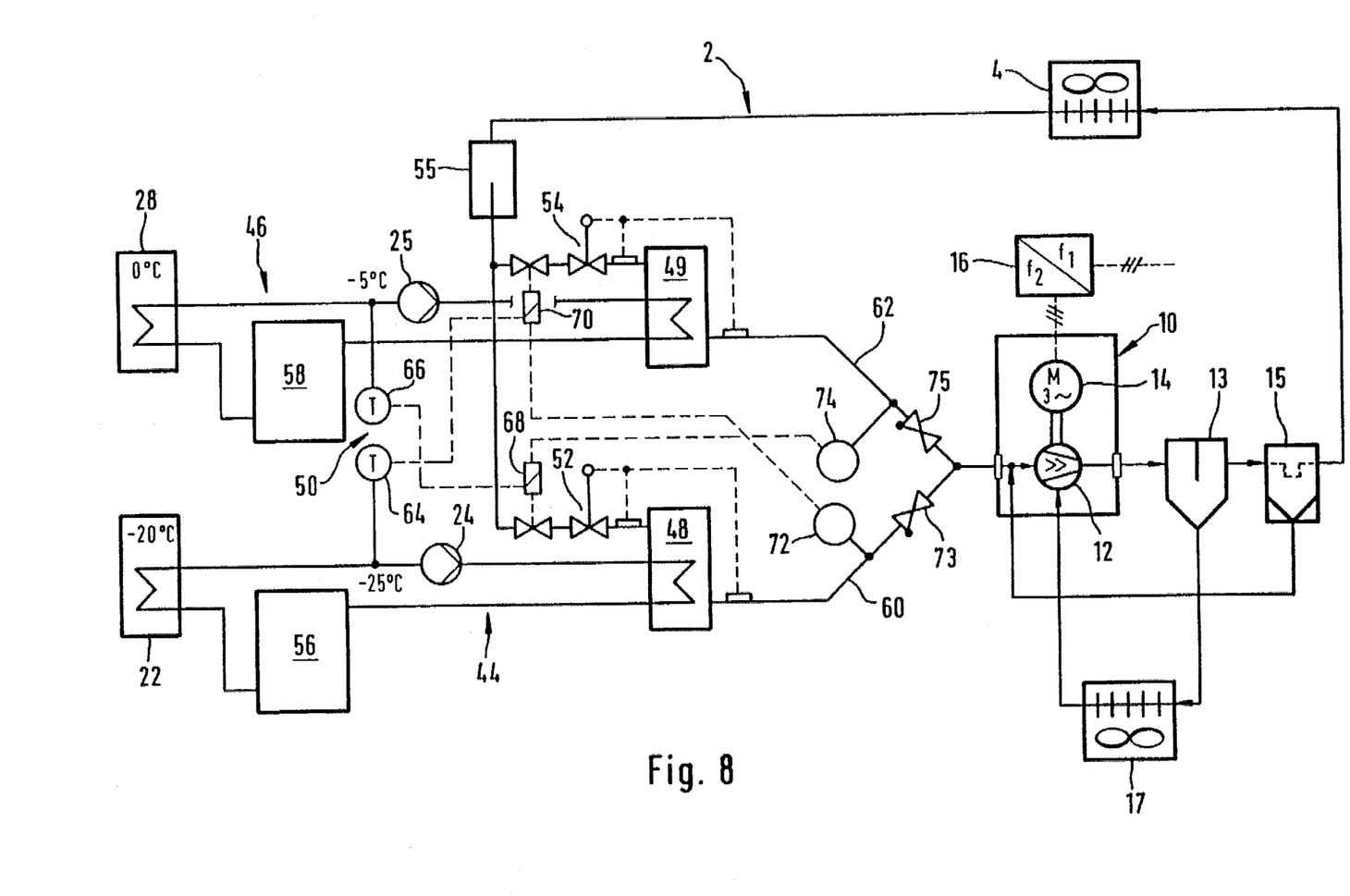
FIG. 8 shows a fourth embodiment of the invention having two evaporators and two separate assigned brine circulations which are alternately supplied with refrigeration capacity by means of single-stage compression.

FIG. 8 shows a fourth embodiment of the invention. This fourth embodiment likewise has a first and a second secondary refrigerant circulation 44 and 46. However, in contrast to the embodiments in accordance with FIGS. 6 and 7, in this case a separate evaporator 48 and 49 and a separate heat exchange device 22 and 28 are assigned to each secondary refrigerant circulation 44 and 46. Via a switching device 50, the refrigerant circulation 2 is alternately conducted through the first evaporator 48 or the second evaporator 49 so that the first secondary refrigerant circulation 44 or the second secondary refrigerant circulation 46 are alternately supplied with refrigeration capacity.

A separate throttle device 6 in the form of an electronic expansion valve 52 and 54 is assigned to each of the two parallel evaporators 48 and 49, respectively. A liquid collector 55 is connected between the electronic expansion valves 52 and 54 and the condenser 4. In order that, despite the alternating supply of the secondary refrigerant circulations 44 and 46 with refrigeration capacity at the heat exchangers 22 or 23, refrigeration capacity can be continuously withdrawn, a first and a second store 56 and 58, respectively, are connected in the first and second secondary refrigerant circulation 44 and 46, respectively.

The two evaporators 48 and 49 are dry evaporators. In order that the secondary refrigerant circulations can provide refrigeration capacity at different temperature levels, e.g. at 0° C. and at –20° C., the assigned evaporators 48 and 49 are designed for different evaporation temperatures. The first evaporator 48 is connected via a vapor line 60 and the second evaporator 49 is connected via a vapor line 62 to the suction port of the screw compressor 12 not shown in more detail.

The switching device 50 comprises, for the first and second secondary refrigerant circulation 44 and 46, a respective first and second brine temperature sensor 64 and 66 which are connected to a first and second switching valve 68 and 70, respectively. The first switching valve 68 is arranged directly upstream of the first electronic expansion valve 52 and the second switching valve 70 is arranged directly upstream of the electronic expansion valve 54 in the refrigerant circulation 2. The two switching valves 68 and 70 are each connected to a first and second low-pressure pressostat or pressure switch 72 and 74. Downstream of the low-pressure pressostat 72 and 74, nonreturn valves 73 and 75 are connected in the lines 62 and 60, respectively.

The functioning of the fourth embodiment according to FIG. 8 is described below. It will be assumed that the evaporator 49 is connected into the refrigerant circulation 2, i.e. the switching valve 70 is open and the switching valve 68 is closed. By this means, the refrigeration capacity provided in the heat exchanger 22 is delivered from the store 56. If the return line temperature of the first brine circuit 44 now exceeds a defined limit value, i.e. the temperature in the store 56 is no longer low enough, the solenoid valve 70 assigned to the evaporator 49 closes. By this means, liquid refrigerant is no longer introduced into the evaporator 49 and the evaporator is "sucked dry" by the compressor 12 and the pressure in the evaporator 49 and in the suction lines 62 and 60 decreases. If the pressure in the lines 60 and 62 has fallen to the evaporator pressure of the evaporator 48, the pressure switch 74 in the line 62 opens the switching valve 68 so that liquid refrigerant now flows into the first evaporator 48 and cold production is initiated for the first secondary refrigerant circulation 44. Similarly, the evaporator 49 is switched over or switched back into the refrigerant circulation 2 when the temperature sensor 66 announces that a defined limit temperature of the brine in the secondary refrigerant circulation 46 has been exceeded.

The control of the total refrigeration capacity of the embodiment according to FIG. 8 by means of the rotary speed controller 16 can be made, for example, via registering the switching cycles between the two secondary refrigerant circulations 44 and 46. If a minimum time between two switching operations between the two secondary refrigerant circulations in undershot, the rotary speed is increased by a fixed amount. It is decreased if a maximum switching time is exceeded.

Figures 9, 10:
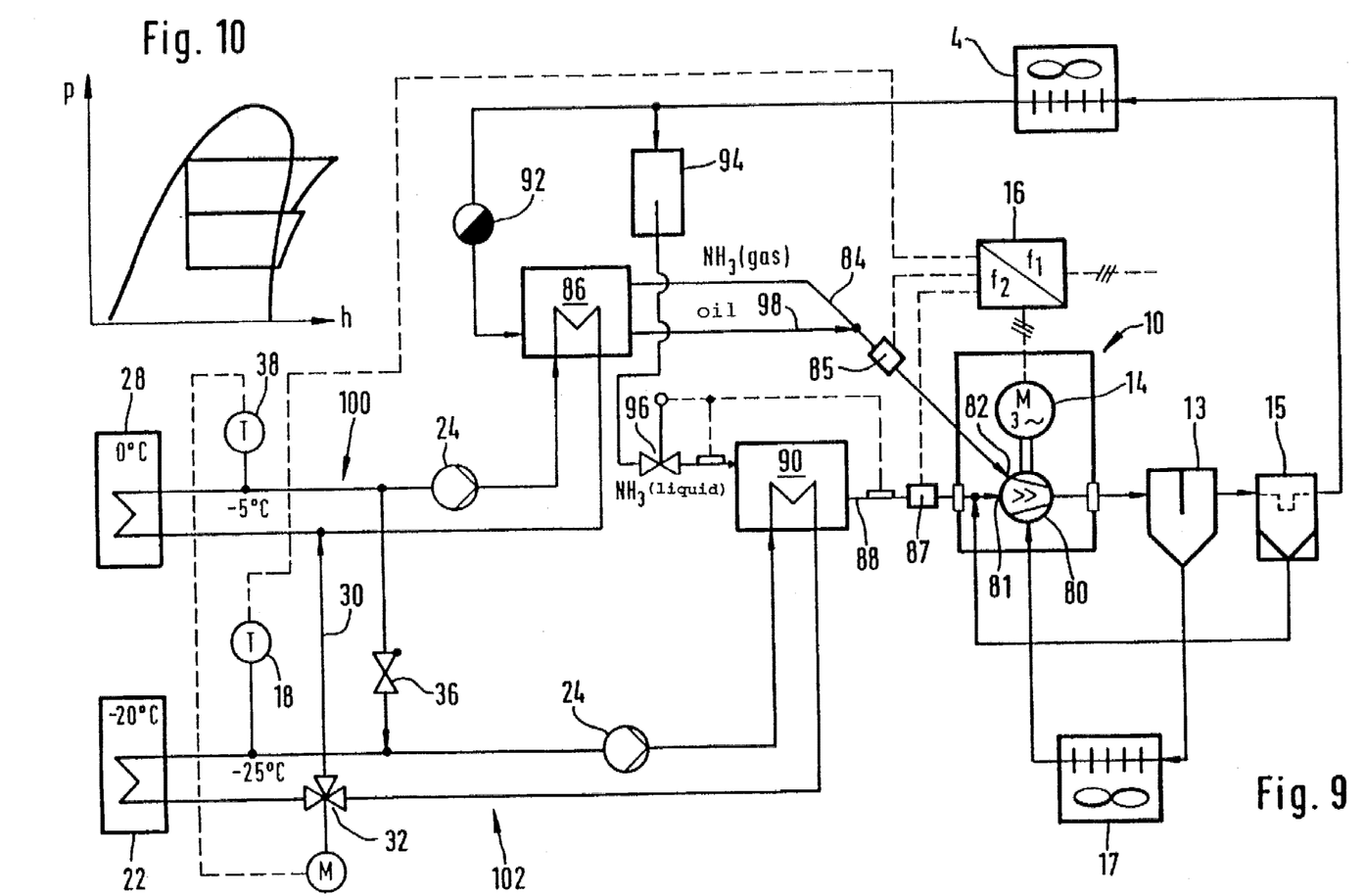
FIG. 9 shows a fifth embodiment of the invention having two brine circulations which, with two different evaporators, are connected to a screw compressor in parallel in a quasi two-stage manner.
FIG. 10 shows the process course of the fifth embodiment in a p-h diagram.

FIGS. 9 and 10 serve to explain a fifth embodiment of the present invention. FIG. 9 showing the circuit diagram and FIG. 10 showing the process sequence in a p-h diagram. The fifth embodiment is a two-stage refrigeration circuit having a special screw compressor 80 which has a first suction port 81 at the lowest pressure level and a second suction port 82 at an intermediate pressure level. The suction port 82 is connected via a line 84 to a first evaporator 86 and the suction port 82 is connected via a suction line 88 to a second evaporator 90. The two evaporators 86 and 90 are connected in parallel in the refrigerant circulation between the condenser 4 and the compressor 80. A throttle device 92 in the form of a high-pressure float separator is connected between condenser 4 and the first evaporator 86 and a high-pressure liquid collector 94 followed by a second throttle device 96 in the form of an electronic expansion valve is connected between condenser 4 and the second evaporator 90.

Oil carried over into the first evaporator 86 is fed to the suction line 84 via a line 98.

The first evaporator 86 produces refrigeration capacity for a first secondary refrigerant circulation 100 at a temperature level which is higher than the temperature level at which the second evaporator 90 produces refrigeration capacity for a second secondary refrigerant circulation 102. The remaining components of the first and second secondary refrigerant circulation correspond to the embodiment according to FIG. 7.

In the embodiment according to FIGS. 9 and 10, both flooded evaporators having a high-pressure separator and dry evaporators with injection from the top can be used.

The rotary speed is controlled in the following manner: two "hermetic" motor flap valves 85 and 87 in the suction lines 84 and 88 control the intake volumetric flow rate according to the desired parameter "brine return line temperature" in the secondary refrigerant circulation 102 having the lowest temperature level. This brine return line temperature in the secondary refrigerant circulation 102 is measured via a temperature sensor 18 and transmitted to the rotary speed controller 16. The controller output signals are called up cyclically by a microprocessor controller not shown in more detail. If at least one throttle flap valve remains completely open, the rotary speed is increased by a fixed amount. If both controller outputs remain for a long period below a defined opening state (e.g. less than 0.7 of complete opening), the rotary speed is reduced. Ideally in this case, the rotary speed is set so that at least one of the suction sections 84 or 88 remains unthrottled.

Alternatively to this, it is possible, instead of the motor throttle flap valves, to control the partial load via the superheating of two dry evaporators.

Furthermore, the fifth embodiment is equipped with a device for admixing very low temperature brine from the secondary refrigerant circulation 102 to the "warmer" brine in the secondary refrigerant circulation 100, so is provided and described in the second (FIG. 6) and third (FIG. 7) embodiments.

Figures 11, 12:
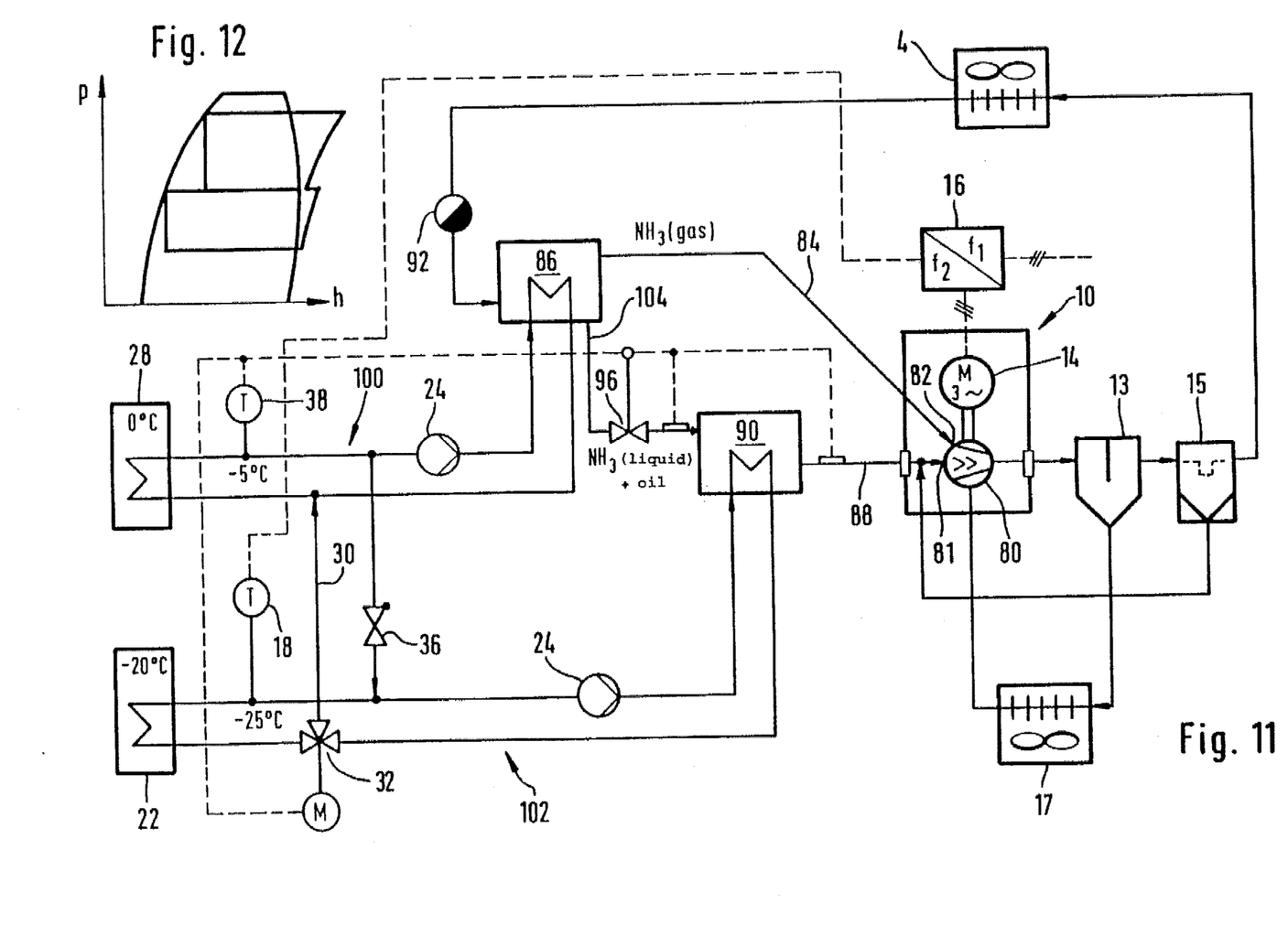
FIG. 11 shows a sixth embodiment of the invention having two brine circulations which, with two different evaporators connected in series, are connected to a screw compressor in a quasi two-stage manner.
FIG. 12 shows a representation of the functioning of the embodiment according to FIG. 11 in a p-h diagram.

The sixth embodiment of the invention shown in FIGS. 11 and 12 differs from the fifth embodiment shown in FIGS. 9 and 10 by the first and second evaporators 86 and 90 not being connected in parallel but in ocries. In this case, the first evaporator 86 is a flooded evaporator which is connected via a liquid line 104 to the second evaporator 90 and supplies this with liquid refrigerant. The first evaporator 86 is arranged above the second evaporator 90, so that, via the line 104, liquid refrigerant and oil carried over there can be taken off at the bottom from the first evaporator 86 and fed to the second evaporator 90. Oil fed to the lower-lying second evaporator 90 is entrained by the refrigerant vapor in the compressor 80, since the second evaporator 89 is designed as a dry evaporator.

By this means, the sixth embodiment has the advantage that oil automatically returns to the screw compressor 80 via the dry evaporator 90. Furthermore, a further advantage of this sixth embodiment is that by exploiting the liquid ammonia portion from the first evaporator 86, and economizer effect results after the first expansion (see FIG. 12).

In the event that more standard refrigeration than deep-freeze refrigeration is required, control of the rotary speed on the bases of the very low temperature brine return line temperature is possible. The requirement for standard refrigeration is controlled by admixture of very low temperature brine via a motor mixer 32, as in the embodiments according to FIGS. 7 and 9. Coverage of the total refrigeration capacity requirement is ensured by returning the standard refrigeration brine to the very low temperature brine circulation.

Figures 13, 14:
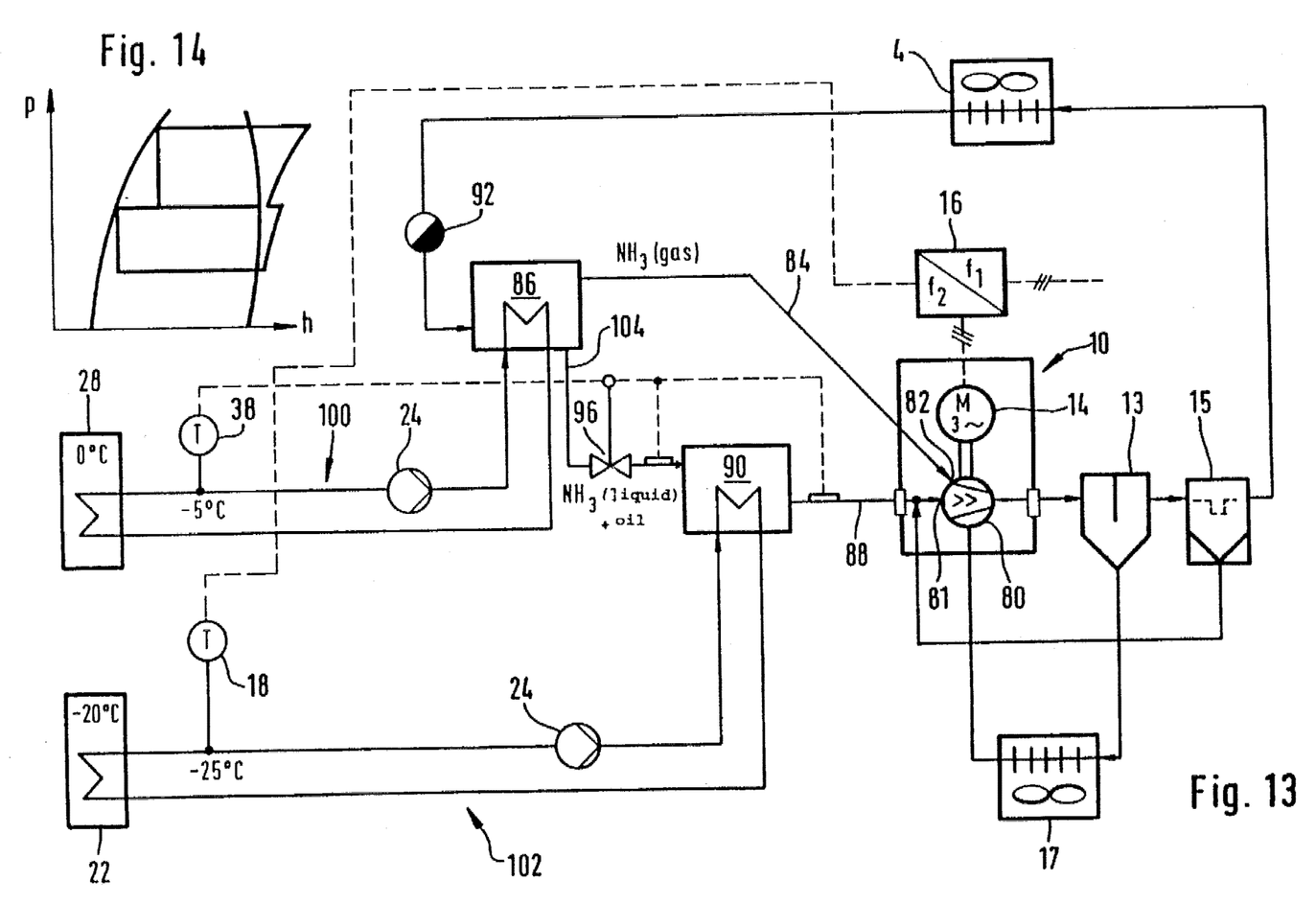
FIG. 13 shows a seventh embodiment of the invention having two brine circulations, similar to the embodiment according to FIG. 11, but without brine admixing.
FIG. 14 shows a representation of the functioning of the embodiment according to FIG. 13 in a p-h diagram.

The seventh embodiment of the invention shown in FIGS. 13 and 14 differs from the sixth embodiment by no device being provided for admixing very low temperature brine from the secondary refrigerant circulation 102 to the standard temperature brine in the second refrigerant circulation 100, i.e. the two secondary refrigerant circulations are materially completely separate. The total refrigeration capacity is controlled by the brine return line temperature of the very low temperature brine in the secondary refrigerant circulation 102. The distribution of this total refrigeration capacity between very low temperature circulation 102 and standard temperature circulation 100 i.e. the ratio between the refrigeration capacity which is produced in the second evaporator 90 and the refrigeration capacity which is produced in the first evaporator 96, is controlled by controlling the volumetric flow rate in the suction lines 88 of the second evaporator (80) (deep-freeze refrigeration). The volumetric flow rate in the suction line 88 is varied by means of the electronic expansion valve 96 upstream of the second evaporator 90 by superheat control. Alternatively, the volumetric flow rate can also be varied by a throttle flap valve (not shown) arranged in the suction line 88.

Figure 15:
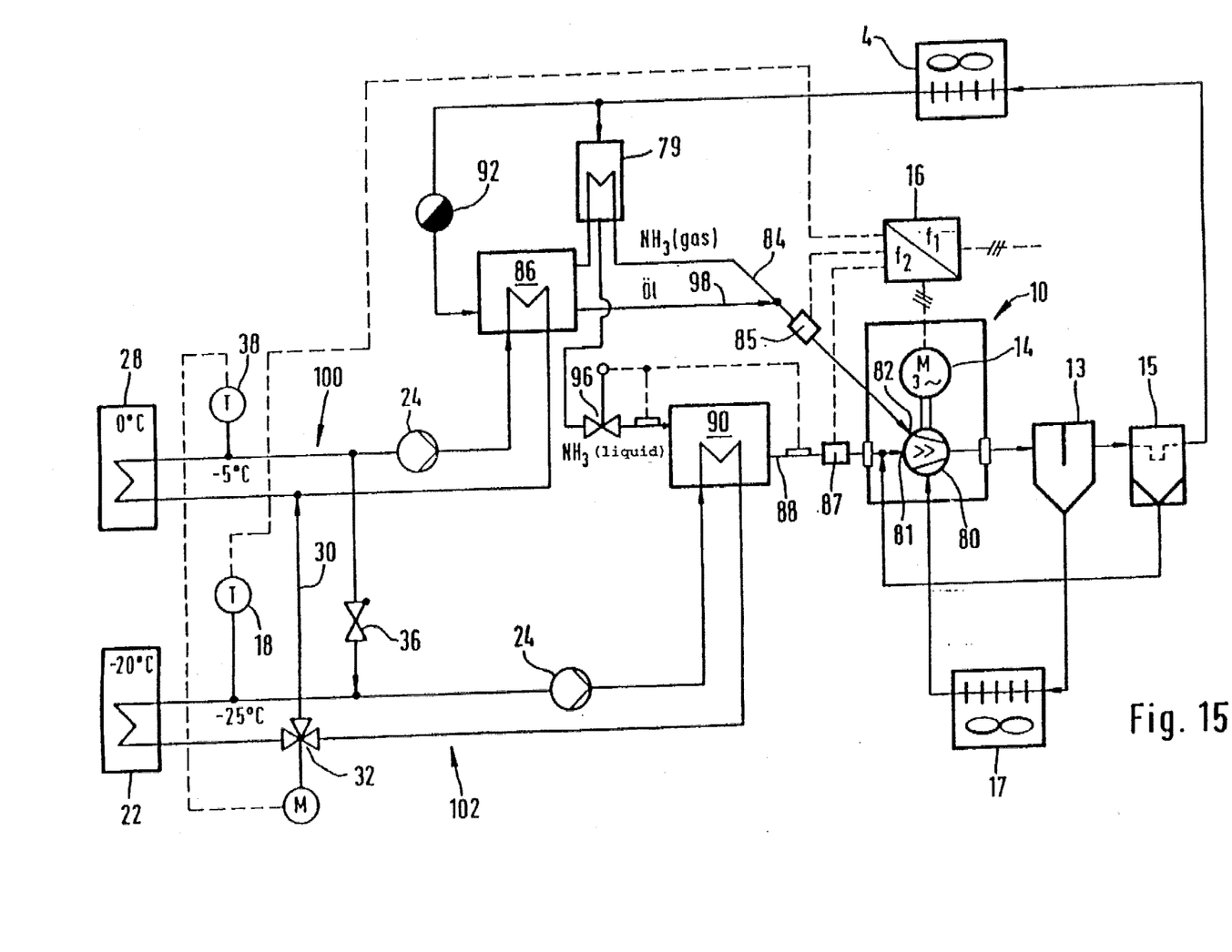
FIG. 15 shows an eighth embodiment of the invention, similar to the embodiment according to FIG. 9, but with subcooling of the liquid refrigerant upstream of the entry into the evaporator operated at a lower temperature level.

The eighth embodiment of the invention shown in FIG. 15 differs from the embodiment shown in FIG. 9 by the liquid refrigerant passed to the evaporator 90 for providing the deep-freeze refrigeration being cooled in a heat exchanger 79 by the suction gas exiting from the evaporator 86 for the standard refrigeration. At the same compressor power consumption, in comparison to the embodiment shown in FIG. 9, the deep-freeze refrigeration capacity is increased and the standard refrigeration capacity is decreased because of the decreasing suction gas density in the heat exchanger 79.

Figure 16:
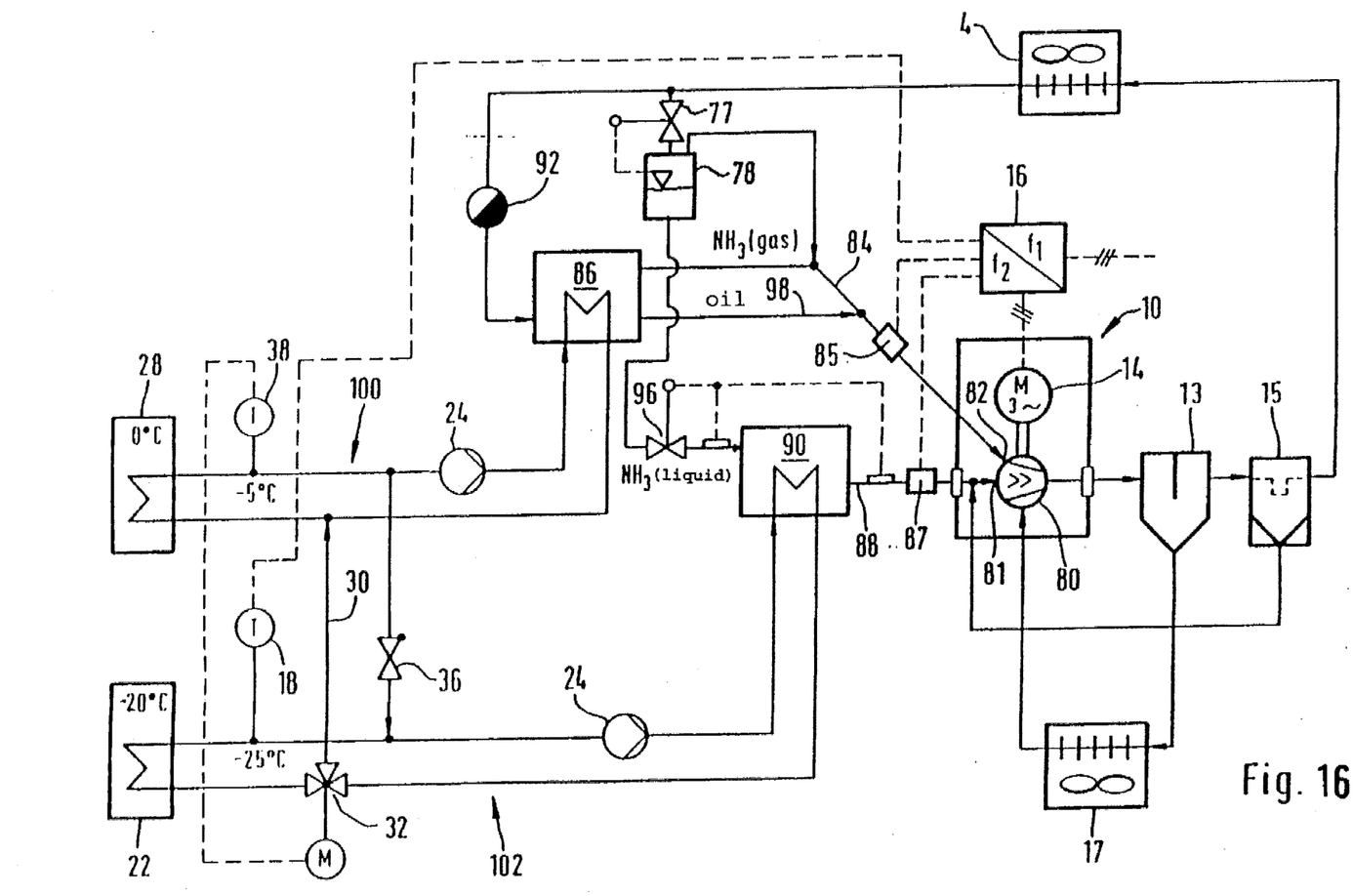
FIG. 16 shows a ninth embodiment of the invention, similar to the embodiment according to FIG. 15, but having a different circuit for subcooling the liquid refrigerant.

The ninth embodiment of the invention shown in FIG. 16 differs from the eighth embodiment shown in FIG. 15 by the liquid refrigerant being subcooled in a different manner. The liquid refrigerant is passed via a throttle element 77 into an intermediate expansion vessel 78, where it partially evaporates with cooling. The level of the liquid refrigerant in the intermediate expansion vessel 78 is controlled by the throttle element 77. From the intermediate expansion vessel, the liquid refrigerant passes via the throttle element 96 into the evaporator 90 for the deep-freeze refrigeration, and the gaseous portion is introduced into the suction gas line 84 between the evaporator 86 for the standard refrigeration and the compressor 80. As in the eighth embodiment of the invention shown in FIG. 15, this circuit, with unchanged compressor power, increases the deep-freeze refrigeration capacity and decreases the standard refrigeration capacity. Upstream of the throttle element 96 in this circuit there is only the pressure prevailing in the intermediate expansion vessel 78. This pressure is only slightly above the pressure prevailing in the suction gas line 84. This pressure is possibly not sufficient for problem-free operation of the thermostatic expansion valve, so that in these cases a different type of construction must be selected for the throttle element 96.

We claim:

1. A compression refrigeration machine having ammonia as refrigerant, a condenser, a throttle device, an evaporator device and a motor-compressor unit which comprises an electric motor and a compressor driven by the electric motor, wherein the motor-compressor unit is arranged in a semi-hermetic or hermetic encapsulation, the electric motor in the semi-hermetic encapsulation is arranged outside the suction gas stream flowing into the compressor and outside the discharge gas stream exiting from the compressor in such a manner that the electric motor is only exposed to an essentially static ammonia atmosphere and the motor-compressor unit and the semi-hermetic encapsulation are composed of materials stable or resistant to ammonia.

2. The refrigeration machine as claimed in claim 1, wherein the coils of the electric motor are composed of aluminum and are insulated in an ammonia-resistant manner, in particular by means of PTFE.

3. The refrigeration machine as claimed in claim 2, wherein the stator coils of the electric motor are wedged.

4. The refrigeration machine as claimed in claim 1, wherein the semi-hermetic encapsulation comprises a vessel adapted to be semi-hermetically sealed by a screwable cover and an inelastic flat seal, in particular comprised of graphite.

5. The refrigeration machine as claimed in claim 1, wherein the compressor has oil injection for cooling.

6. The refrigeration machine as claimed in claim 1, wherein the motor-compressor unit is cooled by a cooling device arranged outside the semi-hermetic encapsulation.

7. The refrigeration machine as claimed in claim 1, wherein the motor-compressor unite is arranged in such a manner that the motor is situated above the compressor.

8. The refrigeration machine as claimed in claim 1, wherein the motor-compressor unit and the semi-hermetic encapsulation are designed for suction pressures below ambient pressure.

9. The refrigeration machine as claimed in claim 1, wherein the compressor is a compressor having a rotating compression element, in particular a screw compressor.

10. The refrigeration machine as claimed in claim 1, featuring a brine or secondary refrigerant circulation through the evaporator device and a heat exchange device.

11. The refrigeration machine as claimed in claim 1, featuring a device for controlling the refrigeration capacity by demand, which device comprises a rotary speed controller for the motor-compressor unit.

12. The refrigeration machine as claimed in claim 11, wherein the device for controlling the refrigeration capacity comprises a temperature sensor for determining the cooling temperature and this cooling temperature is the controlling variable for the rotary speed controller of the motor compressor unit.

13. The refrigeration machine as claimed in claim 12, wherein the cooling temperature sensor determines the brine return line temperature.

14. The refrigeration machine as claimed in claim 1, wherein the throttle device is an electronic expansion valve.

15. The refrigeration machine as claimed in claim 1, wherein the throttle device is a high-pressure float separator.

16. The refrigeration machine as claimed in claim 1, wherein at least a second secondary refrigerant circulation is provided which conducts brine having a higher temperature level than the brine in the first secondary refrigerant circulation, refrigeration capacity being fed to the second secondary refrigerant circulation by admixing colder brine from the first secondary refrigerant circulation.

17. The refrigeration machine as claimed in claim 16, wherein the admixture of brine from the first secondary refrigerant circulation to the second secondary refrigerant circulation is controlled by the brine return line temperature in the second secondary refrigerant circulation.

18. The refrigeration machine as claimed in claim 1, wherein the evaporator device has a second evaporator by means of which gaseous refrigerant can be provided at a pressure or temperature level which is above the pressure or temperature level of the first evaporator and a separate secondary refrigerant circulation is assigned to each evaporator.

19. The refrigeration machine as claimed in claim 18, featuring a switching device by means of which the first and second evaporators can alternately be connected to the suction port of the compressor.

20. The refrigeration machine as claimed in claim 19, wherein connection of the first or second evaporator to the suction port of the compressor is controlled by the temperature in the brine return line of the assigned secondary refrigerant circulation.

21. The refrigeration machine as claimed in claim 19, wherein the number of switchovers and/or the duration of the switching in of the individual secondary refrigerant circulations is used for the rotary speed control and thus for the control of the total refrigeration capacity.

22. The refrigeration machine as claimed in claim 18, wherein the compressor has a first and at least a second suction port, the suction pressure of the first suction port being lower than the suction pressure of the second suction port, and the first evaporator is connected to the first suction port and the second evaporator is connected to the second suction port.

23. The refrigeration machine as claimed in claim 22, wherein the first and second evaporators are connected in parallel between condenser and compressor.

24. The refrigeration machine as claimed in claim 22, wherein the first and second evaporators are connected in series.

25. The refrigeration machine as claimed in claim 22, wherein the rotary speed is controlled via the brine temperature, in particular the brine return line temperature of the secondary refrigerant which provides refrigeration capacity at the lowest temperature level, and the refrigeration capacity is apportioned between the individual secondary refrigerant circulations by variation of the volumetric flow rate in the suction line having the lowest suction pressure, this variation being made by the brine temperature in the secondary refrigerant circulation having refrigeration capacity at the higher temperature level.

26. The refrigeration machine as claimed in claim 25, wherein this variation is made by actuating the throttle device upstream of the first evaporator.

27. The refrigeration machine as claimed in claim 25, wherein this variation is made by means of a throttle flap valve in the suction stream of the first evaporator.

* * * * *